(12) United States Patent
Martin

(10) Patent No.: US 6,526,737 B2
(45) Date of Patent: Mar. 4, 2003

(54) ATTACHMENT FOR GARDEN RAKE AND METHOD OF MAKING SAME

(76) Inventor: David A. Martin, 1275 Martin Rd., Hood River, OR (US) 97031

( * ) Notice: Subject to any disclaimer, the term of this patent is extended or adjusted under 35 U.S.C. 154(b) by 0 days.

(21) Appl. No.: 09/820,106

(22) Filed: Mar. 28, 2001

(65) Prior Publication Data

US 2002/0139100 A1 Oct. 3, 2002

(51) Int. Cl.[7] ............................................. A01D 7/10
(52) U.S. Cl. ............................. 56/400.07; 56/DIG. 9
(58) Field of Search ....................... 56/400.04, 400.05, 56/400.07; 294/50–52, 59

(56) References Cited

U.S. PATENT DOCUMENTS

| | | | | |
|---|---|---|---|---|
| 707,948 A | * | 8/1902 | Spillane | 294/51 |
| 720,500 A | * | 2/1903 | Spillane | 294/51 |
| 1,093,535 A | * | 4/1914 | Civita et al. | 37/266 |
| 2,114,394 A | * | 4/1938 | Lines | 56/400.06 |
| 2,114,518 A | | 4/1938 | Bayliss | 55/10 |
| 2,350,207 A | * | 5/1944 | Wyscaver | 160/127 |
| 2,637,261 A | | 5/1953 | Wale | 97/66 |
| 3,691,743 A | | 9/1972 | Browning | 56/400.05 |
| 3,870,300 A | * | 3/1975 | Amendola | 224/274 |
| 4,602,474 A | | 7/1986 | Palumbo | 56/400.05 |
| 4,970,853 A | * | 11/1990 | Greene, III | 56/400.01 |
| 5,452,570 A | * | 9/1995 | Schmid | 56/400.07 |
| 5,452,769 A | | 9/1995 | Markert | 172/380 |
| 5,499,852 A | * | 3/1996 | Seigendall | 294/54.5 |
| 5,809,760 A | | 9/1998 | Rexroat | 56/400.05 |
| 5,887,364 A | * | 3/1999 | Toth | 37/266 |

\* cited by examiner

Primary Examiner—Thomas B. Will
Assistant Examiner—Meredith C. Petravick
(74) Attorney, Agent, or Firm—Klarquist Sparkman, LLP

(57) ABSTRACT

An attachment for a garden rake includes a transversely curved hoe-like blade cut from twelve inch diameter polyvinyl chloride plastic pipe. The blade has a transverse circumferential dimension greater than the length of the teeth of the rake and a length greater than the length of the rake head bar. The blade is removably attached to the teeth of the rake by compatibly curved washers, also cut from the same plastic pipe, such that the teeth are sandwiched between the blade and the washers, the assembly being held in place by bolts and wing nuts.

4 Claims, 2 Drawing Sheets

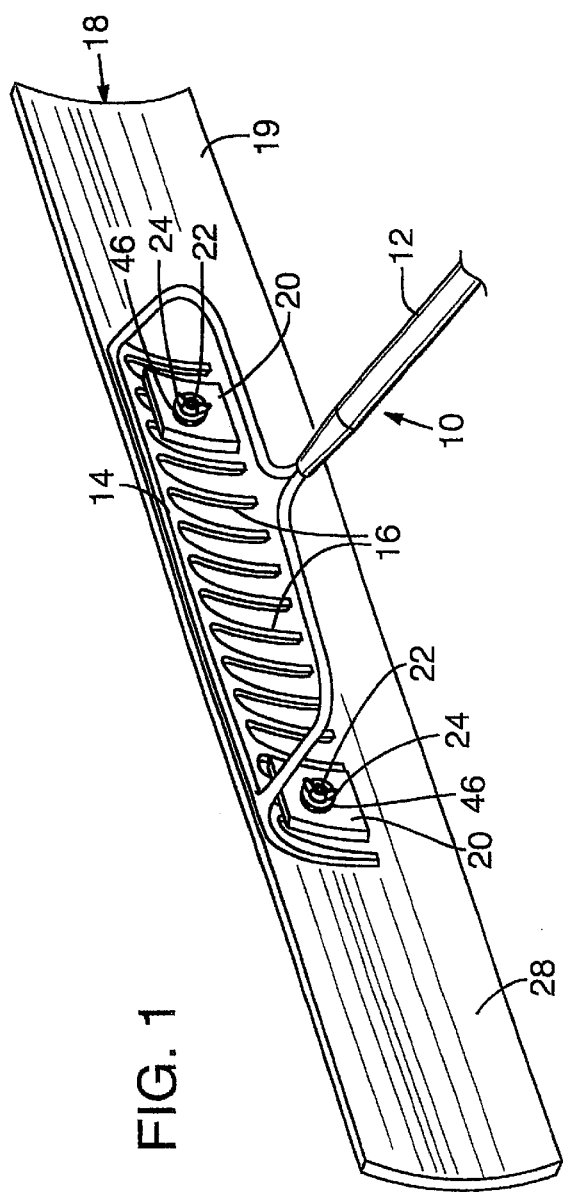
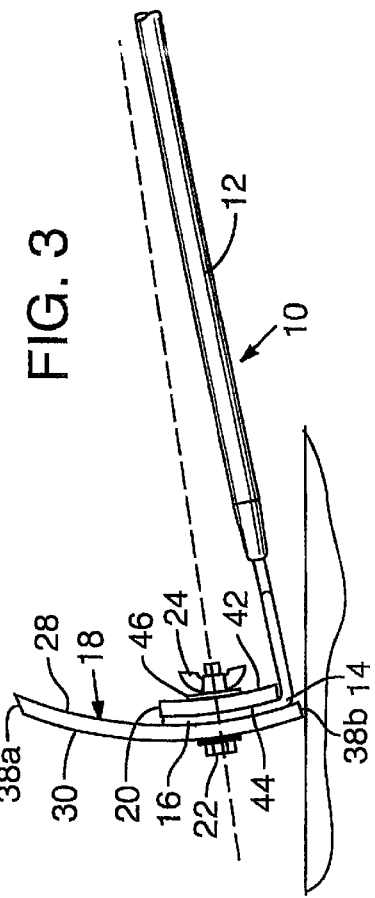
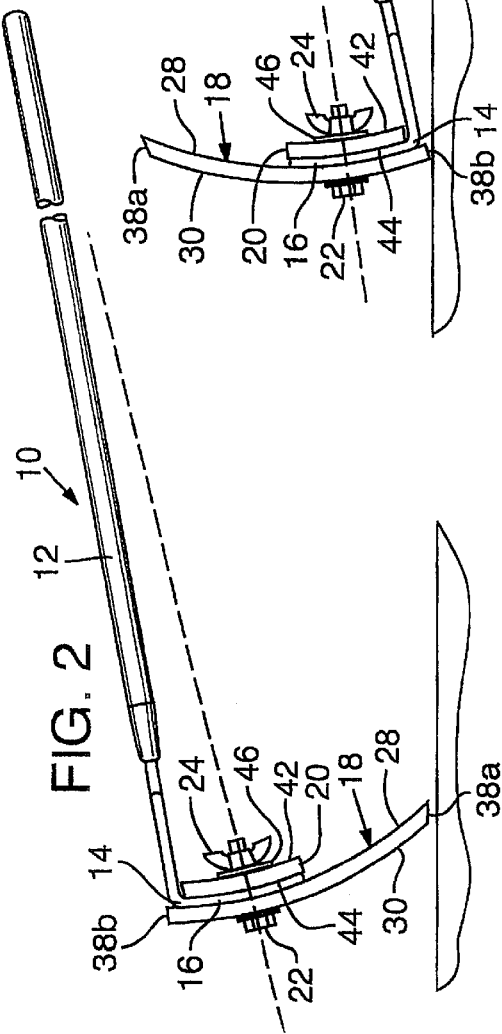

ATTACHMENT FOR GARDEN RAKE AND METHOD OF MAKING SAME

FIELD OF THE INVENTION

This invention relates to garden tools and, more particularly, to a removable attachment for a garden rake.

BACKGROUND OF THE INVENTION

Gardeners, whether professional or just average home owners, justifiably desire to minimize the number of tools and implements required to accomplish their tasks. One of the implements necessary for all gardeners is the usual garden rake. The rake has a reasonably long and durable handle. Desirably, it should be convertible into forms suitable for a variety of other endeavors besides the usual raking. One of the forms is that of a garden hoe.

If a garden hoe has a suitable shape, it can serve as a landscape or concrete rake. It would then be able to move much more material than the usual garden rake and at the same time, level, smooth and contour the shape of a project. If provided with an appropriate contour, the thus converted rake would be able to push material, break up clods of dirt, and push small rocks back into the soil, all of which would save time when preparing a lawn for seeding.

Convertible rakes have been known heretofore. Examples have been disclosed in Civita et al., U.S. Pat. No. 1,093,535; Wale, U.S. Pat. No. 2,637,261; Bayliss, U.S. Pat. No. 2,114,518; Browning, U.S. Pat. No. 3,691,743; Palumbo, U.S. Pat. No. 4,602,474; Markert, U.S. Pat. No. 5,452,769; and Rexroat, U.S. Pat. No. 5,809,760. None of these are currently available on the market. The reason is that each is expensive to build.

Accordingly, it is the primary object of the present invention to provide an attachment for a garden rake that will enable the rake easily and quickly to be converted into a hoe-like implement for the purposes above enumerated.

A further object of the present invention is to provide such an attachment capable of being economically manufactured such that it can be offered to the average gardener at an attractive price.

A still further object of the present invention is to provide a quick, efficient and economical method of making such an attachment.

SUMMARY OF THE INVENTION

The garden rake for which my attachment is well suited comprises the usual handle portion, a head bar and a plurality of teeth extending downwardly from the head bar. The teeth are generally curved such that they are convex on the sides opposed to the handle portion and concave on the side of the handle portion.

The attachment comprises a generally rectangular, transversely curved hoe-like blade. The blade comprises a segment of a length of pipe and, as such, has a concave face and a convex face. Because of this, the segment is adapted to be placed with its concave face adjacent the exterior surfaces of the garden rake teeth. The segment has a transverse circumferential dimension greater than the length of the rake teeth and a longitudinal dimension greater than the length of the rake head bar. The segment has a plurality of apertures spaced apart a desired distance along its length, generally two such apertures.

The attachment further comprises a plurality of washers corresponding to the number of apertures disposed in the blade. Each of the washers also comprises a segment of the pipe of which the blade is a segment. As such, each of the washers has a concave face and a convex face, but each is substantially smaller both in longitudinal and transverse dimension than the blade. Each of the washers is thus adapted to being placed with its convex face adjacent the interior surfaces of the garden rake teeth. And each of the washers has an aperture disposed generally centrally thereof.

The attachment further comprises a fastener for each of the washers. The fasteners are adapted to retain the teeth of the garden rake securely sandwiched between the washers and the blade. As such, each of the fasteners comprises a threaded bolt and a nut. The bolt is adapted to pass through the aperture in one of the washers and the respective aperture in the blade. In this way the fasteners can retain the blade securely in contact with the exterior surfaces of the garden rake teeth, yet permit the attachment to be easily disassembled after use.

Preferably, I have found that polyvinyl chloride plastic pipe is a preferred material from which the blade and the washers can be made. Specifically, pvc pipe having a nominal diameter of about twelve inches is most suitable for use. And the fasteners each preferably comprise a threaded bolt and a wing nut.

My method of making the combined garden rake and attachment comprises providing a garden rake having a handle portion, a head bar and a plurality of teeth extending downwardly from the head bar. The method further comprises cutting a piece of pipe of a desired diameter to a length equal to the desired length of a hoe-like blade that is to be attached to the garden rake. The method further comprises cutting the length of pipe longitudinally along a plurality of its diameters to obtain at least one first segment of pipe having a concave face and a convex face and a transverse circumferential dimension greater than the length of the teeth of the garden rake. The method further comprises providing a plurality of apertures in the one first segment of pipe. The apertures are spaced apart longitudinally a desired distance along the length of the one first segment. Preferably, two symmetrically placed apertures are provided, spaced about one foot apart along the length of the one first segment.

The method further comprises cutting a plurality of washer elements from the piece of pipe of the desired diameter. Each of the washer elements has a concave face and a convex face and is cut such that it has a transverse circumferential dimension substantially smaller than the transverse circumferential dimension of the one first segment of pipe. Each washer element is also cut such that its longitudinal dimension is about equal to its transverse circumferential dimension. The method further comprises providing an aperture disposed generally centrally in each of the washer elements.

The method further comprises placing the one first segment of pipe with its concave face adjacent the exterior surfaces of the garden rake teeth. Then one of the washer elements is placed with its convex face adjacent the interior surfaces of the garden rake teeth opposite each of the apertures in the one first segment of pipe. In this way the teeth are sandwiched between the blade and the washer elements.

Finally, the method comprises passing a threaded fastener through the apertures in each of the washer elements and the respective aperture in the blade. In this way the blade is secured to the rake teeth, yet is conveniently and easily removed. The attachment is facilitated because the washer elements are compatibly curved in the transverse circumferential direction with the hoe-like blade.

Preferably, the piece of pipe selected has a diameter of about twelve inches. The piece of pipe is cut such that the transverse circumferential dimension of the one first segment is about five inches. The washer elements are cut such that their transverse circumferential dimension is about two inches, and their longitudinal dimension is also about two inches.

BRIEF DESCRIPTION OF THE DRAWINGS

FIG. 1 is a perspective view of a garden rake with my attachment installed.

FIG. 2 is a side elevational view of the rake and attachment illustrated in FIG. 1 in one mode of operation.

FIG. 3 is a side elevational view of the rake and attachment illustrated in FIG. 1 in another mode of operation.

DETAILED DESCRIPTION

Figure 4:
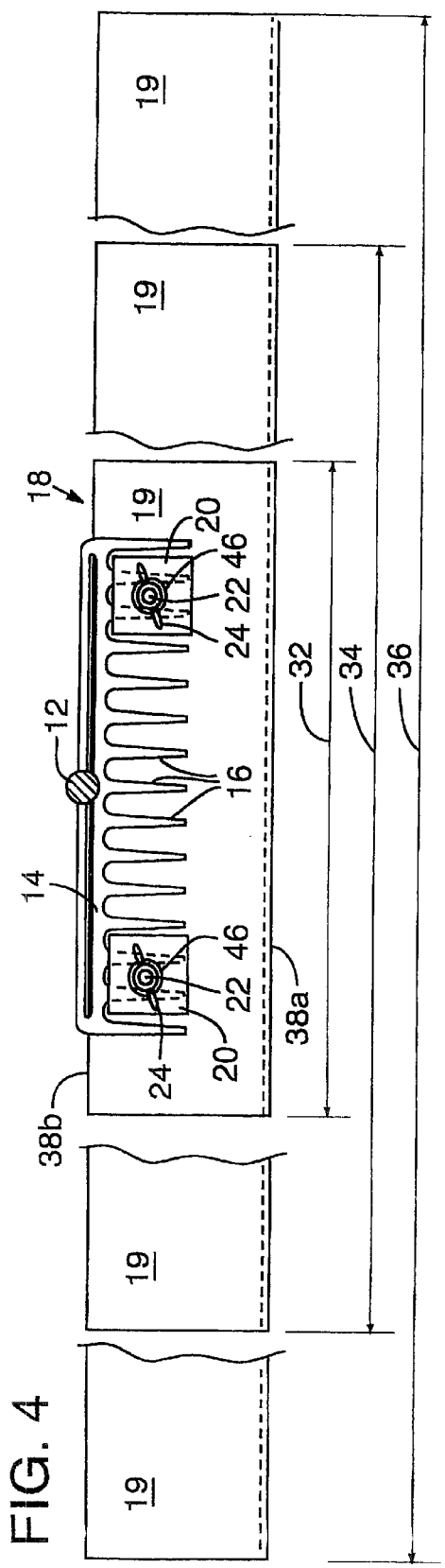
FIG. 4 is a view of the rake and attachment taken along line 4—4 in FIG. 1 and illustrating different lengths of hoe-like blades useful as attachments to a garden rake.

Referring to the drawings and particularly to FIGS. 1–4 thereof, a garden rake 10 for which my attachment is suitable comprises a handle portion 12, a head bar 14, and a plurality of teeth 16 which extend downwardly from head bar 14.

An elongated, generally rectangular, transversely curved hoe-like blade 18 is adjustably attached to teeth 16 by a pair of washers 20 by means of threaded bolts 22 and wing nuts 24.

Blade 18 comprises a segment 19 of a length of pipe 26. Segment 19 is desirably cut from twelve inch nominal diameter polyvinyl chloride plastic pipe. Such pipe is available, for example, from Pacific Western Extruded Plastics Company, Eugene, Oreg. 97440, as its TWIN SEAL™ gasketed pipe P.R. (pressure rated) 63 psi-SDR 64. The pipe has an average outside diameter of 12.750 inches, an approximate inside diameter of 12.352 inches, a minimum wall thickness of 0.199 inch, and weighs approximately 513.4 pounds per 100-foot length. Because segment 19 is cut from twelve inch nominal diameter pipe 26, segment 19 has a concave face 28 and a convex face 30. Segment 19 can be cut in various lengths, for example, one and one-half foot lengths 32, two foot lengths 34, and three foot lengths 36, as desired, and as shown in FIG. 4.

Segment 19 is attached to teeth 16 with its concave face 28 adjacent the exterior surfaces of teeth 16, which are themselves typically compatibly curved inwardly as shown. The transverse circumferential dimension of segment 19 is greater than the length of teeth 16, and the longitudinal dimension of segment 19 is greater than the length of head bar 14, as shown in FIGS. 1 and 4.

Figure 5:
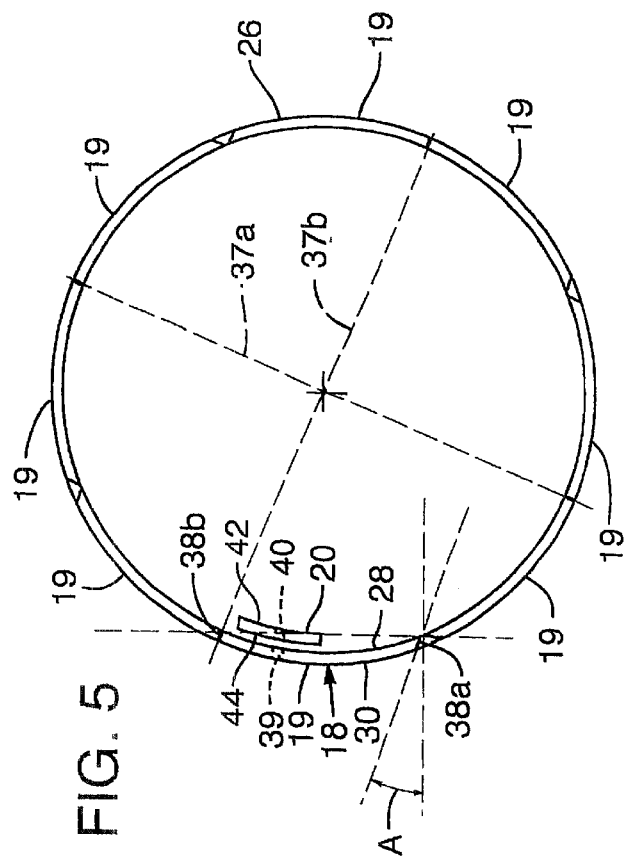
FIG. 5 is a sectional view through a piece of pipe illustrating the cutting of the piece longitudinally along a plurality of its diameters to obtain a segment of pipe suitable for use as the hoe-like blade.

Pipe 26 is desirably first cut such that segment 19 is of a desired length, one and one-half feet, two feet, or three feet, as hereinabove set forth. Inasmuch as pipe 26 has an outside diameter of 12.750 inches, I preferably cut pipe 26 longitudinally along four of its diameters to achieve segments 19 having a transverse circumferential dimension along their convex faces 30 of approximately five inches. This is shown diagrammatically in FIG. 5, where two such diameters 37a and 37b are shown. Trimming the edges of segment 19 as shown in FIGS. 2, 3 and 5 (one edge 38a is desirably trimmed such that it makes an angle A of about twenty degrees with the opposing edge 38b) results in a desirable final transverse circumferential dimension for segment 19 of about four and three-quarter inches.

Two apertures 39 are then punched or drilled symmetrically in segment 19 spaced apart preferably a distance of one foot, one-half inch.

Washers or follower plates 20 are also cut from pipe 26, preferably using a segment 19 that is not to be used as a blade 18. Washers 20 are preferably cut such that the transverse circumferential dimension and the longitudinal dimension of each is about two inches An aperture 40 is drilled centrally in each of washers 20. Each washer 20 thus has a concave face 42 and a convex face 44. Each washer 20 is placed with its convex face 44 adjacent the compatibly curved interior surfaces of teeth 16 with its aperture 40 in register with an aperture 38 in segment 19.

A one-quarter inch by one and one-quarter inch self-locking bolt 22 is passed through each of apertures 39 in segment 19 and the respective aperture 40 in the respective washer 20. A one-quarter inch flat washer 46 together with a wing nut 24 are attached to each bolt 22 such that rake teeth 16 are sandwiched between the compatibly curved segment 19 and the compatibly curved washers or follower plates 20.

Rake 10 with the thus attached blade 18 can then be used for a variety of leveling, smoothing and contouring projects. Blade 18, however, can easily be removed when rake 10 is to be used for its general raking purpose.

I claim:

1. In combination:

a garden rake comprising a handle portion, a head bar and a plurality of inwardly curved teeth extending downwardly from the head bar; and an attachment comprising:

an elongated, generally rectangular, transversely curved blade, the blade comprising a first segment of a piece of pipe, the first segment comprising a concave face and a convex face, the first segment being placed with its concave face adjacent the inwardly curved exterior surfaces of the teeth of the garden rake, the pipe being of a diameter selected whereby the concave and convex faces of the first segment are compatibly curved with the curved teeth of the garden rake, the first segment having a transverse circumferential dimension greater than the length of the teeth of the garden rake, whereby an edge of the first segment extends outwardly of the teeth of the garden rake, the first segment having a longitudinal dimension greater than the length of the head bar of the rake, the first segment being provided with a plurality of apertures spaced apart a desired distance along its length, a plurality of washers corresponding to the plurality of apertures disposed in the first segment, each of the washers comprising a second segment of the piece of said pipe, each of the washers having a concave face and a convex face, each of the washers being smaller in longitudinal and transverse dimension than the first segment of the length of pipe, each of the washers being adapted to be placed with its convex face adjacent the interior surfaces of the inwardly curved teeth of the garden rake, each of the washers being compatibly curved in the transverse circumferential direction with the teeth of the garden rake and the first segment of the length of pipe, each of the washers being provided with an aperture disposed generally centrally thereof;, and a fastener for each of the washers, the fasteners being adapted to retain the teeth of the garden rake securely sandwiched between the washers and the blade, each of the fasteners comprising a threaded bolt and a nut, each of the bolts being adapted to pass through the aperture in the respective washer and the corresponding aperture in the blade, thereby removably to retain the blade securely in contact with the inwardly curved exterior surfaces of the teeth of the garden rake.

2. The attachment of claim 1, wherein said edge of said first segment extending outwardly of the teeth of the garden rake comprises a ground-contacting edge extending outwardly of the teeth of the garden rake, said ground-contacting edge being trimmed at an angle of about twenty degrees with respect to the opposite edge, thereby to provide the blade with a sharp longitudinally extending cutting edge.

3. A method of making a combined garden rake and removable, transversely curved blade, the method comprising:

providing a garden rake comprising a handle portion, a head bar and a plurality of inwardly curved teeth extending downwardly from the head bar;

providing a piece of pipe having a diameter selected whereby the curvature thereof is compatible with the curved teeth of the garden rake;

cutting the piece of pipe to a length equal to the desired length of the blade, said desired length being greater than the length of the head bar of the rake;

cutting the length of pipe longitudinally along a plurality of its diameters to obtain at least one first segment of pipe having a concave face and a convex face and a transverse circumferential dimension greater than the length of the teeth of the garden rake;

providing a plurality of apertures in the one first segment of pipe, the apertures being spaced apart longitudinally a desired distance along the length of the one first segment;

cutting a plurality of washer elements from the piece of pipe, each of the washer elements having a concave face and a convex face, each of the washer elements having a transverse circumferential dimension smaller than the transverse circumferential dimension of the one first segment of pipe and a longitudinal dimension about equal to its transverse circumferential dimension;

providing an aperture disposed generally centrally in each of the washer elements;

placing the one first segment of pipe with its concave face adjacent the inwardly curved exterior surfaces of the teeth of the garden rake with one edge of the one first segment extending outwardly of the teeth of the garden rake;

placing one of the washer elements with its convex face adjacent the inwardly curved interior surfaces of the teeth of the garden rake opposite each of the apertures in the one first segment of pipe, whereby the teeth of the garden rake are sandwiched between the one first segment of pipe and the washer elements; and passing a threaded fastener through the apertures in each of the washer elements and the respective aperture in the one first segment of pipe, removably to secure the first segment of pipe to the inwardly curved exterior surfaces of the teeth of the garden rake, and wherein the washer elements are compatibly curved in the transverse circumferential direction with the curved interior surfaces of the teeth of the garden rake.

4. The method of claim 3, further comprising cutting said one edge of said one first segment of pipe at an angle of about twenty degrees with respect to the other edge of said one first segment of pipe to provide said one edge of said one first segment of pipe with a sharp cutting edge.

* * * * *